US011930327B2

(12) United States Patent
Higgins et al.

(10) Patent No.: US 11,930,327 B2
(45) Date of Patent: *Mar. 12, 2024

(54) WAX PROTECTION FOR IN-CANAL HEARING DEVICE

(71) Applicant: Starkey Laboratories, Inc., Eden Prairie, MN (US)

(72) Inventors: Sidney A. Higgins, Maple Grove, MN (US); Brian Thomas Dahl, Minnetrista, MN (US)

(73) Assignee: Starkey Laboratories, Inc., Eden Prairie, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/101,625

(22) Filed: Jan. 26, 2023

(65) Prior Publication Data

US 2023/0254653 A1 Aug. 10, 2023

Related U.S. Application Data

(63) Continuation of application No. 17/237,579, filed on Apr. 22, 2021, now Pat. No. 11,595,769, which is a (Continued)

(51) Int. Cl.
*H04R 25/00* (2006.01)

(52) U.S. Cl.
CPC ......... *H04R 25/652* (2013.01); *H04R 25/604* (2013.01); *H04R 2225/021* (2013.01); *H04R 2225/025* (2013.01)

(58) Field of Classification Search
CPC ...... H04R 25/652; H04R 25/60; H04R 25/65; H04R 1/1016; H04R 25/654;

(Continued)

(56) References Cited

U.S. PATENT DOCUMENTS 6,795,562 B1 9/2004 Gunnersen et al.
7,110,562 B1 9/2006 Feeley et al.

(Continued)

FOREIGN PATENT DOCUMENTS

AU 750900 8/2002
CA 2336648 1/2000

(Continued)

OTHER PUBLICATIONS

"Non-Final Office Action," for U.S. Appl. No. 17/273,579 dated Aug. 16, 2022 (7 pages).

(Continued)

*Primary Examiner* — Carolyn R Edwards
*Assistant Examiner* — Julie X Dang
(74) *Attorney, Agent, or Firm* — Pauly, DeVries Smith & Deffner LLC

(57) ABSTRACT

A hearing aid assembly includes a receiver speaker enclosed within a receiver housing. The receiver housing defines a circuitous receiver acoustic channel, wherein the receiver channel defines an open side along at least a portion of the receiver channel. The receiver channel also defines a pass-through passage extending from a first side of the receiver housing to a second side of the receiver housing, wherein the pass-through passage is partially defined by the wall defining a receiver opening. The hearing aid assembly also includes an earbud configured to fit over at least a portion of the receiver housing and partially cover the open side of the receiver channel.

20 Claims, 15 Drawing Sheets

Related U.S. Application Data continuation of application No. 16/685,331, filed on Nov. 15, 2019, now Pat. No. 10,993,054.

(60) Provisional application No. 62/770,372, filed on Nov. 21, 2018.

(58) Field of Classification Search
CPC ............ H04R 25/658; H04R 2225/025; H04R 25/656; H04R 2225/021; H04R 25/604; H04R 25/602; H04R 1/10; H04R 1/105; H04R 1/1075; H04R 1/1066; H04R 2225/0216; H04R 25/02; H04R 25/607; H04R 25/55; H04R 2225/0213; H04R 2460/17; H04B 5/0006
See application file for complete search history.

(56) References Cited

U.S. PATENT DOCUMENTS

| | | | | |
|---|---|---|---|---|
| 7,443,993 | B2 | 10/2008 | Gunnersen et al. | |
| D632,793 | S | 2/2011 | Gunnersen | |
| 8,019,106 | B2 | 9/2011 | Gunnersen et al. | |
| D654,591 | S | 2/2012 | Gunnersen | |
| 8,284,974 | B2 | 10/2012 | Pander et al. | |
| 8,848,956 | B2 | 9/2014 | Higgins et al. | |
| 8,861,761 | B2 * | 10/2014 | Higgins | H04R 25/607 381/322 |
| 9,232,325 | B2 | 1/2016 | Hagedorn-olsen et al. | |
| 9,479,878 | B2 | 10/2016 | Higgins et al. | |
| 10,993,054 | B2 * | 4/2021 | Higgins | H04R 25/604 |
| 11,595,769 | B2 * | 2/2023 | Higgins | H04R 25/652 |
| 2009/0304216 | A1 * | 12/2009 | Hansen | H04R 25/604 381/324 |
| 2010/0124346 | A1 * | 5/2010 | Higgins | H04R 25/55 439/86 |
| 2012/0087526 | A1 | 4/2012 | Higgins et al. | |
| 2012/0087527 | A1 | 4/2012 | Higgins et al. | |
| 2012/0087528 | A1 | 4/2012 | Higgins | |
| 2012/0237065 | A1 * | 9/2012 | Higgins | H04R 1/025 29/896.21 |
| 2014/0226843 | A1 * | 8/2014 | Pan | H04R 1/1075 381/309 |
| 2014/0355803 | A1 | 12/2014 | Higgins et al. | |
| 2015/0350762 | A1 | 12/2015 | Birger et al. | |
| 2016/0057551 | A1 | 2/2016 | Higgins et al. | |
| 2016/0286324 | A1 | 9/2016 | Van Den Berg et al. | |
| 2020/0162828 | A1 | 5/2020 | Higgins et al. | |
| 2020/0382856 | A1 * | 12/2020 | Liu | H04R 1/2826 |
| 2021/0243540 | A1 | 8/2021 | Higgins et al. | |

FOREIGN PATENT DOCUMENTS

| | | |
|---|---|---|
| CA | 2658114 | 1/2000 |
| EP | 1562398 | 8/2005 |
| EP | 2795922 | 7/2015 |
| JP | 4194760 | 10/2008 |
| WO | 2010114981 | 10/2010 |

OTHER PUBLICATIONS

"Notice of Allowance," for U.S. Appl. No. 16/685,331 dated Jan. 6, 2021 (13 pages).
"Notice of Allowance," for U.S. Appl. No. 17/273,579 dated Oct. 19, 2022 (12 pages).
"Response to Non Final Office Action," for U.S. Appl. No. 17/237,579, filed Sep. 16, 2022 (6 pages).

* cited by examiner

WAX PROTECTION FOR IN-CANAL HEARING DEVICE

This application is a continuation of U.S. patent application Ser. No. 17/237,579, filed Apr. 22, 2021, which is a continuation of U.S. patent application Ser. No. 16/685,331, filed Nov. 15, 2019, and issued as U.S. Pat. No. 10,993,054 on Apr. 27, 2021, which claims the benefit of U.S. Provisional Application No. 62/770,372, filed Nov. 21, 2018, the content of which is herein incorporated by reference in its entirety.

FIELD

Embodiments herein relate to protecting hearing aid components from damage during use.

BACKGROUND

Hearing aid components are often positioned within a user's ear canal during use, where they provide amplified or otherwise processed sound to the user's ear. A receiver housing is an example of a hearing aid component that can be positioned in a user's ear canal. The receiver housing encloses a receiver speaker, commonly referred to as a receiver, which generates the amplified or processed sound. Earwax accumulation can damage hearing aid components, such as a receiver speaker, if earwax enters the housing of the component. Some hearing aid components have structures that allow earwax to easily enter a receiver housing. Failure to clean a hearing aid component, such as the receiver housing and openings in the receiver housing, to remove accumulated earwax can negatively impact acoustic performance of the device and lead to problems with device function.

Some hearing aid components include replaceable barriers to reduce the likelihood of the earwax entering a receiver housing. The barriers can become clogged and then significantly reduce the sound delivered to the user's ear. Even before becoming clogged, the barriers can reduce acoustic performance of the device. The barriers can be difficult to replace due to their tiny size. Lack of replacement of these barriers can lead to early failure of the hearing aid.

SUMMARY

One general aspect includes a hearing aid assembly including: a receiver assembly including a receiver speaker and a receiver housing defining a receiver cavity to enclose the receiver assembly. The receiver housing defines a circuitous receiver acoustic channel having an open side along at least a portion of the receiver channel. The receiver housing also defines a receiver opening defined in a wall of the receiver channel and in acoustic communication with the receiver cavity. The receiver housing also defines a pass-through passage extending from a first side of the receiver housing to a second side of the receiver housing, where the pass-through passage is partially defined by the wall defining the receiver opening. The hearing aid assembly also includes an earbud configured to fit over at least a portion of the receiver housing, the earbud including an earbud inner surface that at least partially covers the open side of the receiver channel when the earbud is positioned over at least a portion of the receiver housing.

Implementations may include one or more of the following features. The receiver channel is tortuous. The receiver channel includes at least three segments, where each the three segments define an angle with an adjacent segment of 90 degrees or less. The receiver channel defines a receiver acoustic path having at least four turns of 90 degrees or less. The receiver channel includes a front segment defined in a front face of the receiver housing, a side segment defined in a side surface of the receiver housing, and a rear segment extending from the side surface of the receiver housing to the receiver opening. The open side of the receiver channel permits a line of sight to a bottom surface of the receiver channel. The open side of the receiver channel has a width of at least 1 millimeter and the receiver channel has a depth of at least 1 millimeter. The receiver channel includes a wrap-around segment that wraps around a circumference of a side surface of the receiver housing. The receiver housing includes a front receiver housing and a back receiver housing connectable to form the receiver cavity, where the front receiver housing defines the receiver channel, the receiver opening, and the pass-through passage. The front receiver housing is a unitary structure. The pass-through passage is perpendicular to an axis of the receiver opening. The receiver opening includes two separate apertures. The receiver opening includes three separate apertures, where the wall defining the receiver opening includes two ribs, each of the ribs separating two of the three separate apertures. The receiver housing further defines a cavity passage extending from a receiver opening to a cavity opening, where the cavity passage is tapered to have an increasing cross-sectional area as the cavity passage extends away from the receiver opening toward the cavity passage. The receiver housing further includes a filter positioned across the receiver opening, where the filter is a wire mesh, a membrane, a foam, or a polystyrene foam. The filter is secured to the receiver housing by over molding, adhesive, or plastic welding. The earbud inner surface seals against the receiver housing over at least a portion of the open side of the receiver channel when the earbud is positioned over at least a portion of the receiver housing. The earbud includes a flexible material, a resilient material, or an elastomeric material.

One general aspect includes a hearing aid assembly including a receiver assembly including a receiver speaker and a receiver housing defining a receiver cavity to enclose the receiver assembly. The receiver housing defines a circuitous receiver acoustic channel, where at least a portion of the receiver channel defines an open side. The receiver channel includes a front segment defined in a front face of the receiver housing, a side segment defined in a side surface of the receiver housing, and a rear segment extending from the side surface toward a longitudinal axis of the receiver housing and to the receiver opening, where each the front, side, and rear segments define an angle with an adjacent segment of 90 degrees or less. The hearing aid assembly also includes a receiver opening defined in a wall of the receiver channel in acoustic communication with the receiver cavity, where a cavity passage is tapered to have an increasing cross-sectional area as the cavity passage extends away from the receiver opening to the receiver cavity. The hearing aid assembly also includes a pass-through passage extending from a first side of the receiver housing to a second side of the receiver housing, where the pass-through passage includes the rear segment of the receiver channel, where the pass-through passage is transverse to a longitudinal axis of the receiver opening. The hearing aid assembly also includes an earbud sized to fit over at least a portion of the receiver housing, the earbud including an earbud inner surface that at least partially covers the open side of the receiver channel and seals against the receiver housing over at least a portion of the open side of the receiver channel when the earbud is positioned over at least a portion of the receiver housing.

One general aspect includes a method of making a hearing aid assembly including providing a receiver assembly including a receiver speaker and providing a receiver housing defining a receiver cavity to enclose the receiver assembly. The receiver housing defines a circuitous receiver acoustic channel, where the receiver channel defines an open side along at least a portion of the receiver channel, a receiver opening defined in a wall of the receiver channel and configured to be in acoustic communication with the receiver speaker, and a pass-through passage extending from a first side of the receiver housing to a second side of the receiver housing, where the pass-through passage is partially defined by the wall defining the receiver opening. The method also includes assembling the receiver housing around the receiver assembly. The method also includes providing an earbud sized to fit over at least a portion of the receiver housing, the earbud including an earbud inner surface that at least partially covers the open side of the receiver channel when the earbud is positioned over at least a portion of the receiver housing.

This summary is an overview of some of the teachings of the present application and is not intended to be an exclusive or exhaustive treatment of the present subject matter. Further details are found in the detailed description and appended claims. Other aspects will be apparent to persons skilled in the art upon reading and understanding the following detailed description and viewing the drawings that form a part thereof, each of which is not to be taken in a limiting sense. The scope herein is defined by the appended claims and their legal equivalents.

BRIEF DESCRIPTION OF THE FIGURES

Aspects may be more completely understood in connection with the following figures (FIGS.), in which.

Figure 1:
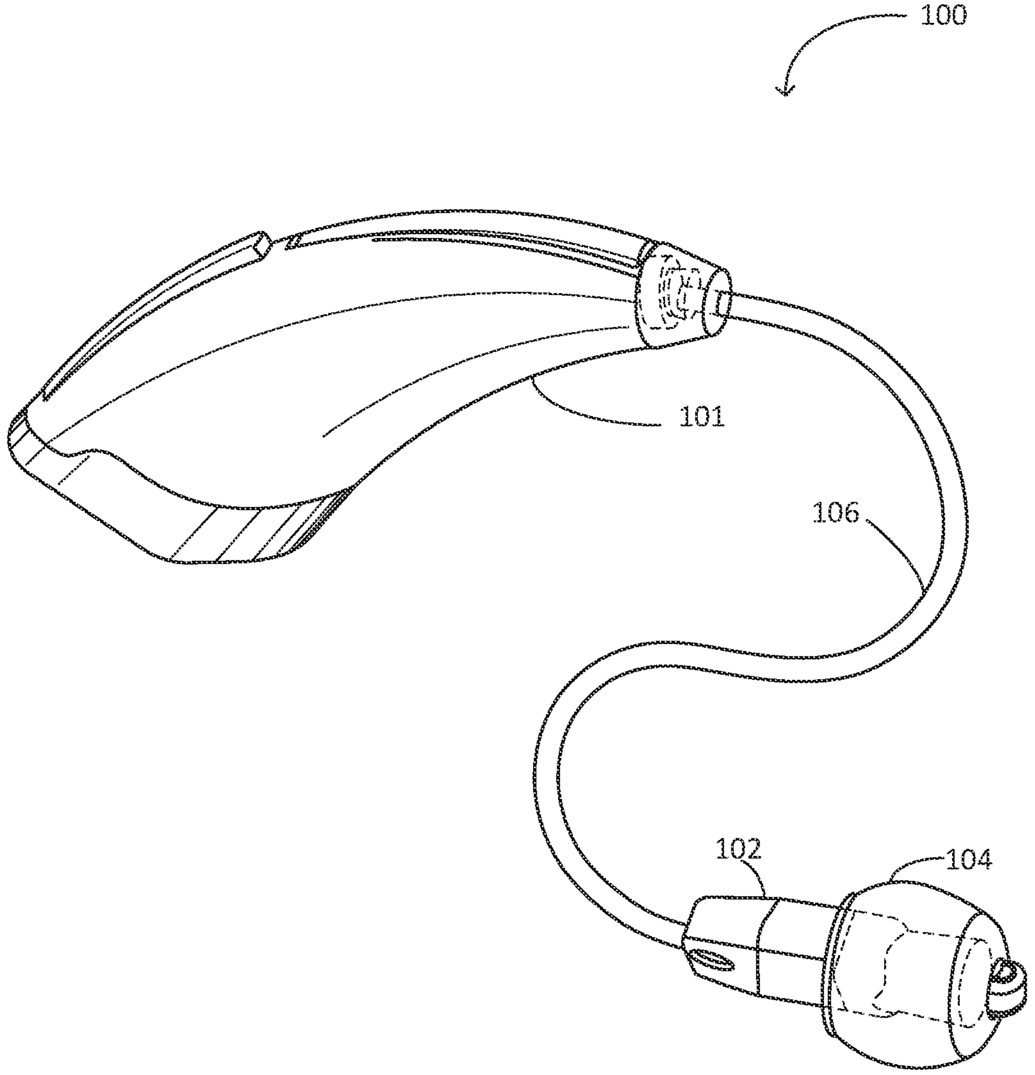
FIG. 1 is a perspective view of a hearing aid system including a behind-the-ear unit, a cable, a receiver housing, and an earbud in accordance with various embodiments herein.

While embodiments are susceptible to various modifications and alternative forms, specifics thereof have been shown by way of example and drawings and will be described in detail. It should be understood, however, that the scope herein is not limited to the particular aspects described. On the contrary, the intention is to cover modifications, equivalents, and alternatives falling within the spirit and scope herein.

DETAILED DESCRIPTION

A hearing aid assembly has a receiver speaker enclosed within a receiver housing, where the receiver housing defines a receiver opening in acoustic communication with the receiver speaker. To reduce earwax entry into the receiver housing, the receiver housing defines a circuitous receiver acoustic channel leading from a front end of the receiver housing to the receiver opening. Earwax must fill the circuitous path and navigate multiple turns in order to fully block the acoustic path and reach the receiver opening. The circuitous receiver acoustic channel will be referred to as the receiver channel herein, for brevity, at times. An earbud that fits over the receiver housing provides the final wall over an open side of the receiver channel. The receiver housing also creates a shelf which blocks direct earwax entry into the receiver opening. This shelf is open on both ends, defining a pass-through passage through the receiver housing. The pass-through passage facilitates easier cleaning of the receiver channel. The open side of the receiver channel also facilitates easier cleaning.

In some examples, the receiver channel includes at least three segments, and each segment defines an angle with an adjacent segment of 90 degrees or less. In some examples, the receiver channel includes at least four segments, and each segment defines and angle with an adjacent segment of 90 degrees or less.

In some examples, the pass-through passage is perpendicular to an axis of the receiver opening. A cleaning motion with a cleaning tool through the pass-through passage will therefore be perpendicular to the receiver opening, and less likely to push earwax into the receiver opening. In some examples, a filter is integrated into the receiver opening and positioned over the receiver opening to reduce earwax and debris from entering the receiver housing through the receiver opening.

The receiver opening in some examples includes multiple apertures. In some examples, ribs divide the receiver opening into multiple apertures. The ribs can serve as an additional barrier to earwax to prevent it or increase the time before it reaches the inside of the receiver housing. The receiver opening in some embodiments is tapered, so that it is narrower closer to the receiver channel and wider closer to the receiver assembly. In addition, or alternatively, if there are multiple apertures making up the receiver opening, the apertures can be tapered to be narrower near the receiver channel and wider closer to the receiver assembly. This configuration can reduce the likelihood of liquid entering the receiver housing through the receiver opening if the receiver housing comes into contact with liquid, such as if liquid is used to clean the receiver housing or the receiver housing accidentally contacts liquid.

Examples of hearing aid systems and receiver housings, where the receiver housing has a circuitous receiver acoustic channel and defines a pass-through passage, are shown in the FIGS. and will now be described. FIG. 1 is a perspective view of a hearing aid system 100 including an external unit 101, a receiver housing 102, an earbud 104 covering a portion of the receiver housing 102, and a cable 106 connecting the external unit 101 with the receiver housing 102, in accordance with various embodiments herein. The external unit 101 may be worn outside of the ear canal, such as over the user's ear, behind the user's ear, clipped to a user's clothing, or many other locations.

A "hearing aid system" as used herein can include many different devices and combinations of devices that aid a person with impaired hearing by producing amplified sound. A "hearing aid system" can also refer to devices that produce optimized or processed sound for a user with normal hearing. The amplified, optimized or processed sound is output to a user, such as into the ear canal of a user.

Components of a hearing aid system device herein can include a control circuit, digital signal processor (DSP), memory (such as non-volatile memory), power management circuitry, a data communications bus, one or more communication devices (e.g., a radio, a near-field magnetic induction device), one or more antennas, one or more microphones, and various sensors as described in greater detail below. More advanced hearing assistance devices can incorporate a long-range communication device, such as a Bluetooth® transceiver or other type of radio frequency (RF) transceiver. The hearing aid system can define a battery compartment into which a battery can be disposed to provide power to the device. These components can be divided between the external unit 101, other external devices, and the receiver housing 102. An external unit 101 can include input devices such as buttons or pads to control the hearing aid system. The receiver housing 102 encloses a speaker, also referred to as a receiver speaker or a receiver. The receiver housing 102 is sized and shaped to fit within a user's ear canal. The hearing aid system 100 can be referred to as a receiver-in-canal (RIC) system. Sound is output from the receiver housing 102 to the user's ear canal. The cable 106 can include one or more electrical conductors and provide electrical communication between components inside of the external unit 101 and components inside of the receiver housing 102. The cable 106 provides an electrical signal from the external unit to drive the receiver to produce sound.

Figure 2:
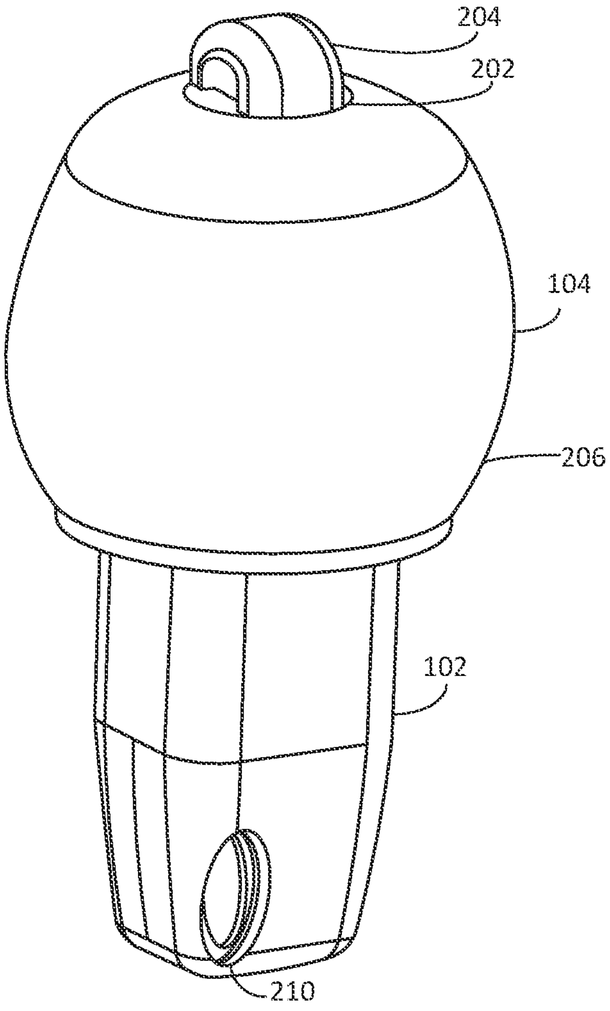
FIG. 2 is a perspective view of the receiver housing and earbud of FIG. 1 in accordance with various embodiments herein.

FIG. 2 is a perspective view of the receiver housing and earbud of FIG. 1 in accordance with various embodiments herein. Sound from the receiver within the receiver housing 102 travels an acoustic path through the receiver housing 102 and earbud 104 and exits at a front earbud opening 202 of the earbud 104. The earbud 104 includes a wax bridge 204 over the front earbud opening 202 and an earbud outer surface 206.

Figure 3:
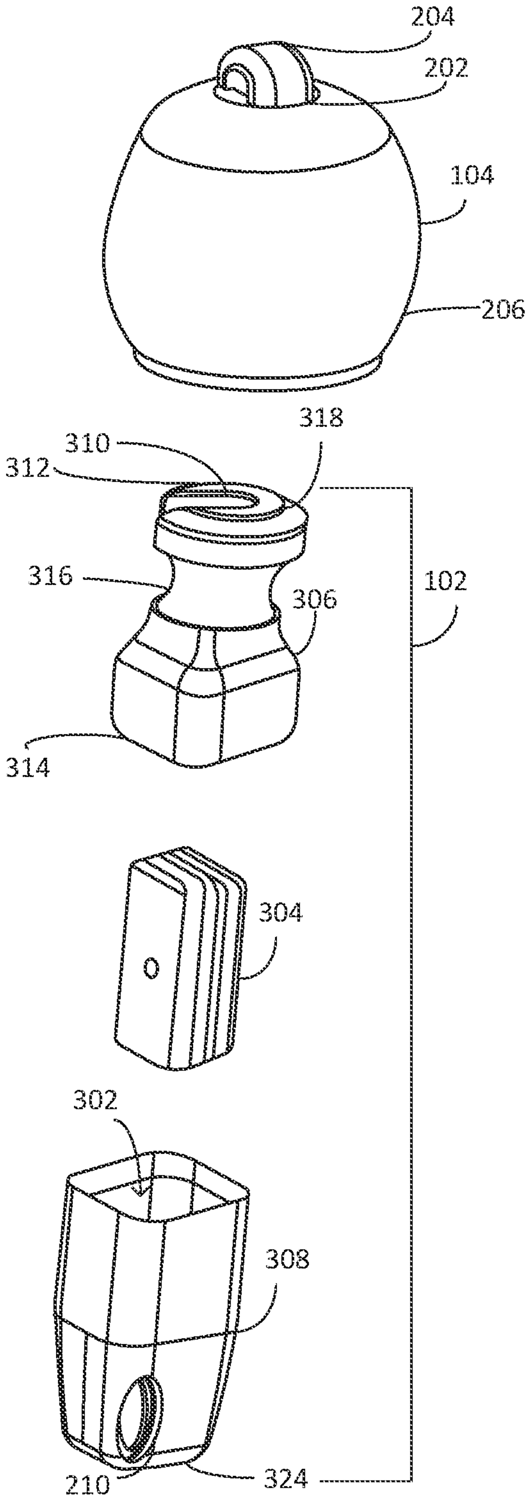
FIG. 3 is a perspective, exploded view of the receiver housing and earbud of FIG. 1 in accordance with various embodiments herein.

FIG. 3 is a perspective, exploded view of the receiver housing 102 and earbud 104 of FIG. 1 in accordance with various embodiments herein. The receiver housing 102 defines a cavity 302 in which the receiver assembly 304 is enclosed. In one example, the receiver housing 102 is made up of a front receiver housing 306 joined to a rear receiver housing 308. The receiver assembly 304 includes the receiver speaker or receiver that converts electrical impulses into sound, such as an electroacoustic transducer, speaker, or loud speaker.

The front receiver housing 306 defines a circuitous receiver acoustic channel 310, and a portion of it is visible in FIG. 3 at a front end 312 of the front receiver housing 306. The circuitous receiver acoustic channel 310, also referred to as the receiver channel 310, forms part of an acoustic path traveled by sound from the receiver assembly 304 to the front earbud opening 202 and into the user's ear canal.

The front receiver housing 306 extends between the front end 312 and the rear end 314 and includes a side surface 316. The rear end 314 of the front receiver housing 306 is connected to the rear receiver housing 308 to form the receiver cavity 302 around the receiver assembly 304. The receiver channel 310 terminates at a front end 318 defined by the front end 312 of the front receiver housing.

Figure 4:
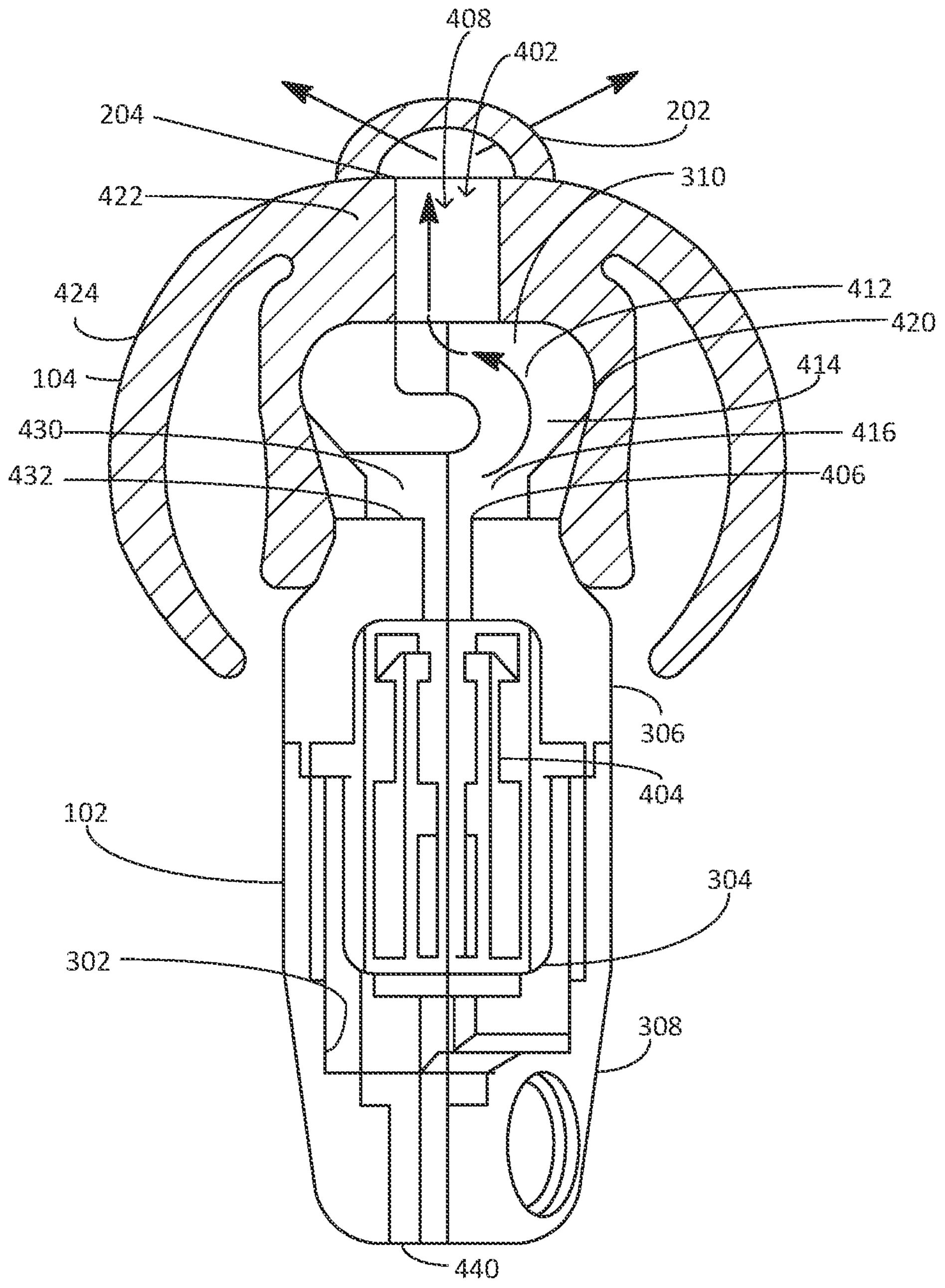
FIG. 4 is a cross-sectional view of the receiver housing and earbud of FIG. 1, in accordance with various embodiments herein.

An acoustic path 402 defined by of the receiver housing and earbud will now be described with respect to FIG. 4. FIG. 4 is a cross-sectional view of the receiver housing and earbud of FIG. 1, in accordance with various embodiments herein. Upon receiving electrical signals via the cable, sound is generated by a receiver 404 within the cavity 302 of the receiver housing 102. The sound travels the acoustic path 402 through a receiver opening 406. The receiver opening 406 is defined in a wall of the receiver channel 310 and is configured to be in acoustic communication with the receiver 404. After leaving the receiver opening 406, the sound travels along multiple segments of the circuitous receiver acoustic channel 310, through an earbud acoustic channel 408, and out the front earbud opening 202 to reach the user's ear canal.

The circuitous receiver acoustic channel 310, or receiver channel 310, is defined by the structure of the front receiver housing 306 and extends from the receiver opening 406 to a front end of the receiver channel 310 defined by the front end 318 of the front receiver housing 306. The receiver channel 310 is not a direct path between the receiver opening 406 and the front end 312 of the front receiver housing 306. The receiver channel 310 travels an indirect, circuitous path. In some examples, the receiver channel 310 is tortuous. By "tortuous", it is meant that the receiver channel 310 is twisting and serpentine. In various examples, the receiver channel includes at least two segments, at least three segments, and at least four segments. In various examples, each segment of the receiver channel 310 define an angle with an adjacent segment of 90 degrees or less. In various examples, the receiver channel has at least four turns of 90 degrees or less.

In the example of FIGS. 4-12, the receiver channel 310 defined in the front receiver housing 306 includes a front segment 412 defined in the front end 312, a side segment 414 defined in the side surface 316, and a rear segment 416 extending from the side surface 316 to the receiver opening 406. These segments are at 90-degree angles to each other.

In various embodiments, a portion of the receiver channel 310 has an open side that is not bounded by the structure of front receiver housing 306. In various embodiments, the receiver channel 310 is structured to permit a line of sight to a bottom surface of the receiver channel 310. When the earbud 104 is placed over a portion of the front receiver housing 306, an earbud inner surface 420 closes the open side of the receiver channel over that portion. When the earbud 104 is removed, the open channel portion of the receiver channel 310 is easy to clean because the user has a line of sight into the receiver channel 310.

The earbud 104 includes an axial wall 422 that surrounds a portion of the front receiver housing 306 when the earbud 104 is placed over a portion of the front receiver housing 306. The axial wall 422 defines and surrounds the earbud acoustic channel 408. In various embodiments, the earbud 104 also includes an outer dome 424. In various embodiments, the earbud 104 is made from a material and constructed so that it uniformly conforms to the ear canal and maintains a constant and comfortable radial pressure on the ear canal. In various examples, the earbud 104 is made of resilient material, such as silicone. In various examples, the earbud 104 is made of a flexible material. By flexible material, it is meant that a material is capable of bending easily without breaking. In various examples, the earbud is made of an elastomeric material. By "elastomeric material", it is meant a material with viscoelasticity that is soft and deformable at ambient temperatures, such as rubber, silicone, and amorphous polymers. The flexibility and resilience of the material facilitates a seal of the earbud inner surface 420 to the front receiver housing 306 over the receiver channel 310. Examples of an earbud 104 are shown in commonly assigned U.S. Pat. No. 9,479,878, titled, "Enhanced Comfort Earbud," issued Oct. 25, 2016, which is incorporated by reference herein in its entirety. Many other configurations of earbud can be used with the hearing aid system described herein.

Pass-Through Passage

The receiver channel 310 and the acoustic path 402 partially defined by the receiver channel 310 overlaps with a pass-through passage 430 that is defined in the front receiver housing 306 and extends from a first side to a second side of the receiver housing 102. The pass-through passage 430 is bounded on one side by the wall or shelf 432 that defines the receiver opening 406. The shelf 432 is open on both ends. The pass-through passage facilitates easier cleaning of the receiver channel.

Figure 5:
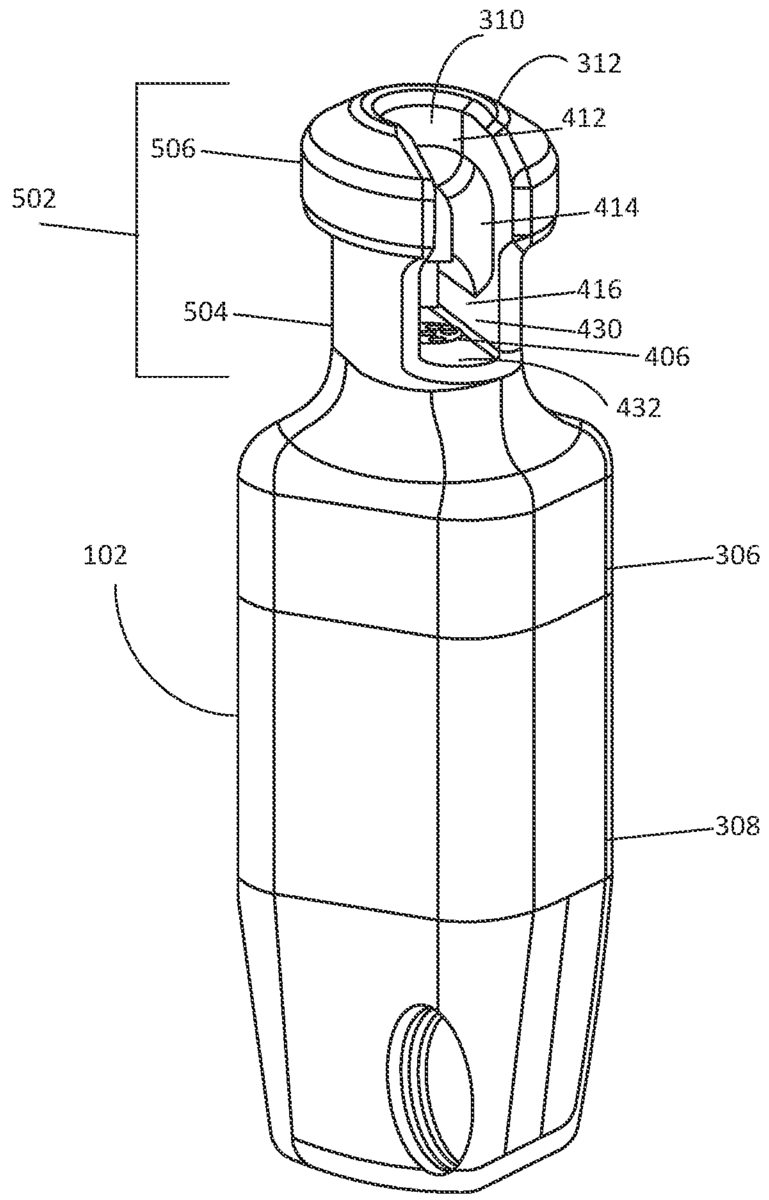
FIG. 5 is a perspective view of the receiver housing of FIG. 1 in accordance with various embodiments herein.

Another view of the pass-through passage 430 and the receiver channel 310 is provided in FIG. 5, which is a perspective view of the receiver housing of FIG. 1 in accordance with various embodiments herein. The wall or shelf 432 defines the receiver opening 406. The receiver opening 406 includes multiple circular apertures.

The open side of the receiver channel 310 is visible in FIG. 5. The receiver channel 310 has an open side along the front segment 412, side segment 414, and rear segment 416. In various embodiments, the width of the open side of the receiver channel 310 is at least about 1 millimeter. In various embodiments, the depth of the receiver channel 310 is at least about 1 millimeter. In various embodiments, the open channel is shaped so that a user has visibility to the entire receiver channel surface.

Figure 6:
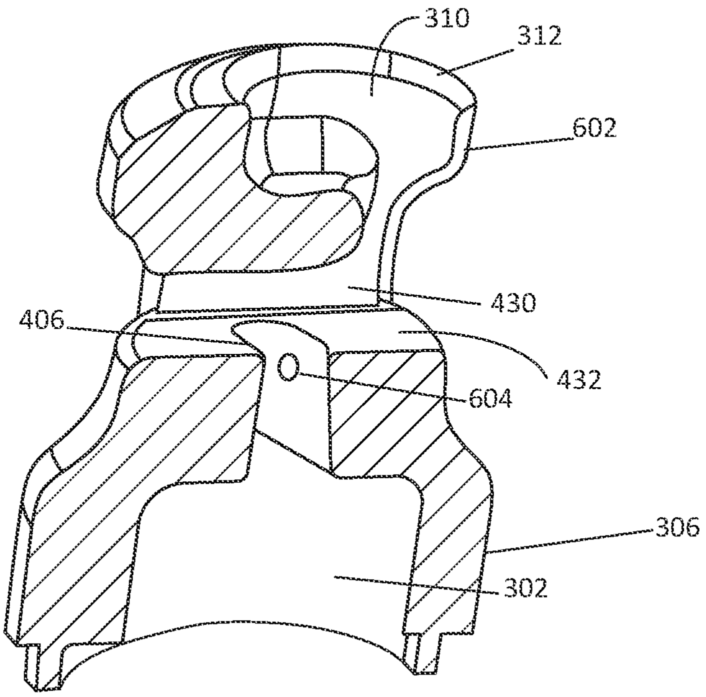
FIG. 6 is a cross-sectional perspective view of a front receiver housing of the receiver housing of FIG. 1 in accordance with various embodiments herein.
Figure 7:
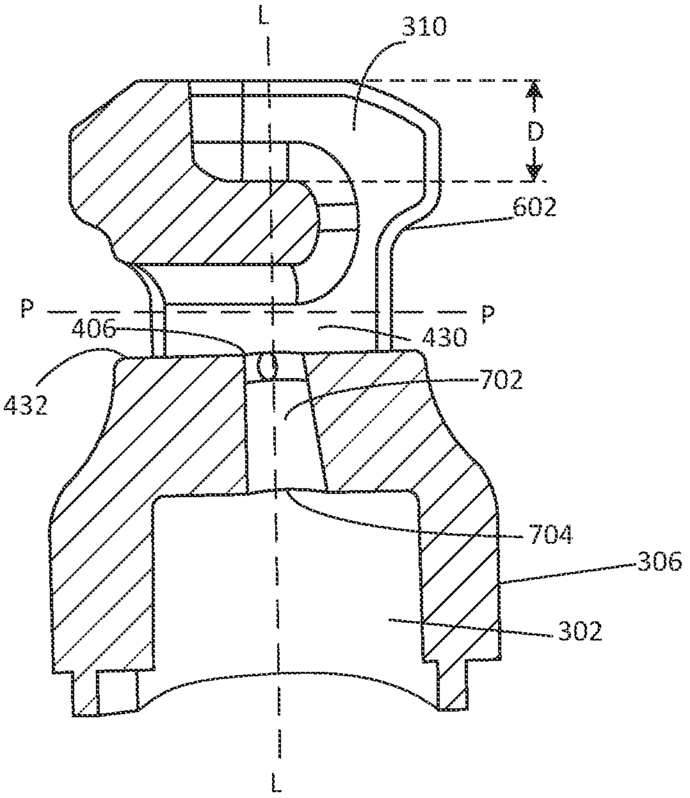
FIG. 7 is a cross-sectional side view of the front receiver housing of FIG. 6 in accordance with various embodiments herein.

FIG. 6 is a cross-sectional perspective view and FIG. 7 is a cross-sectional side view of a front receiver housing 306 in accordance with various embodiments herein, separated from the rear receiver housing (not shown). The cross-sectional plane of FIGS. 6 and 7 slices through the open side 602 of the receiver channel 310. The receiver opening 406 shown in FIGS. 6 and 7 is different than the receiver opening 406 of FIG. 5 and includes a rib 604 that divides the receiver opening into multiple apertures. In various embodiments, one rib, two ribs, three ribs or another number of ribs are provided that extend across the receiver opening 406 and create two, three, four, or another number of multiple apertures.

FIG. 7 shows a longitudinal axis L-L of the front receiver housing, which is also the longitudinal axis of the receiver opening 406. FIG. 7 also shows a longitudinal axis P-P of the pass-through passage 430. In various embodiments, the longitudinal axis of the receiver opening 406 is transverse to the longitudinal axis of the pass-through passage 430. A cleaning motion with a cleaning tool through that portion of the receiver channel 310 will therefore be transverse to the receiver opening, and less likely to push earwax into the receiver opening than if a cleaning motion was in the same direction as the axis of the receiver opening. In various embodiments, such as shown in FIGS. 6 and 7, the longitudinal axis of the receiver opening 406 is approximately perpendicular to the longitudinal axis of the pass-through passage 430. In various embodiments, the longitudinal axis of the front receiver housing 306 is transverse to the longitudinal axis of the pass-through passage. In various embodiments, such as shown in FIGS. 6 and 7, the longitudinal axis of the front receiver housing 306 is approximately perpendicular to the longitudinal axis of the pass-through passage 430. The receiver channel depth D shown in FIG. 7 is at least 1 millimeter in various embodiments.

As seen in FIG. 7, a cavity passage 702 extends from the receiver opening 406 to a cavity opening 704 adjacent to the cavity 302. In various embodiments, the receiver opening 406 has a smaller largest dimension, a smaller cross-sectional area, or both than the cavity opening 704. The cavity passage 702 tapers to a smaller dimension at the receiver opening 406. In other words, the cavity passage is tapered to have an increasing cross-sectional area as the cavity passage extends away from the pass-through passage. This configuration can reduce the likelihood of liquid entering the receiver housing through the receiver opening if the receiver housing comes into contact with liquid, such as if liquid is used to clean the receiver housing or the receiver housing accidentally contacts liquid.

Front Receiver Housing of FIGS. 8-12

Figure 10:
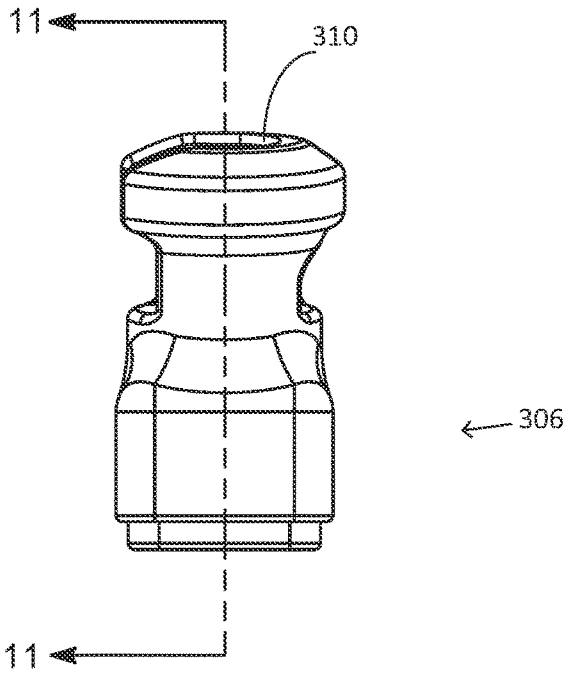
FIG. 10 is a side view of the front receiver housing of FIG. 8.
Figure 11:
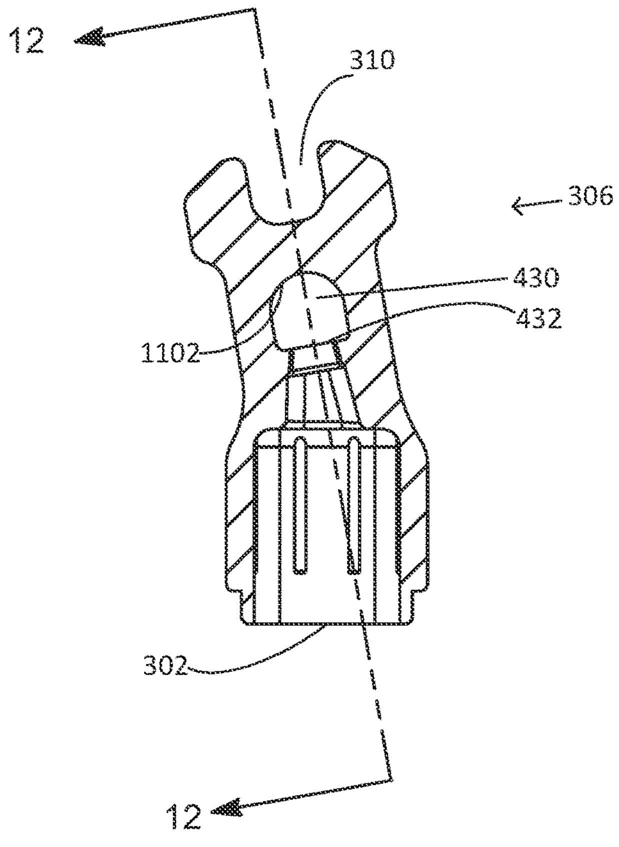
FIG. 11 is a cross-sectional view of the front receiver housing of FIG. 8 along line 11-11 in FIG. 10.

An alternate embodiment of a front receiver housing 306 is shown from different viewpoints in FIGS. 8-12. Like reference numbers refer to similar parts in FIGS. 8-12 compared to FIGS. 1-7. Like the embodiments of FIGS. 1-7, the front receiver housing 306 of FIGS. 8-12 includes a circuitous acoustic receiver channel 310, pass-through passage 430, and defines half of a cavity 302 for the receiver. In various embodiments, the profile of the pass-through passage 430 is D-shaped and is defined by a planar surface formed by the shelf 432 and an arched surface 1102 is shown in FIG. 11.

Figure 12:
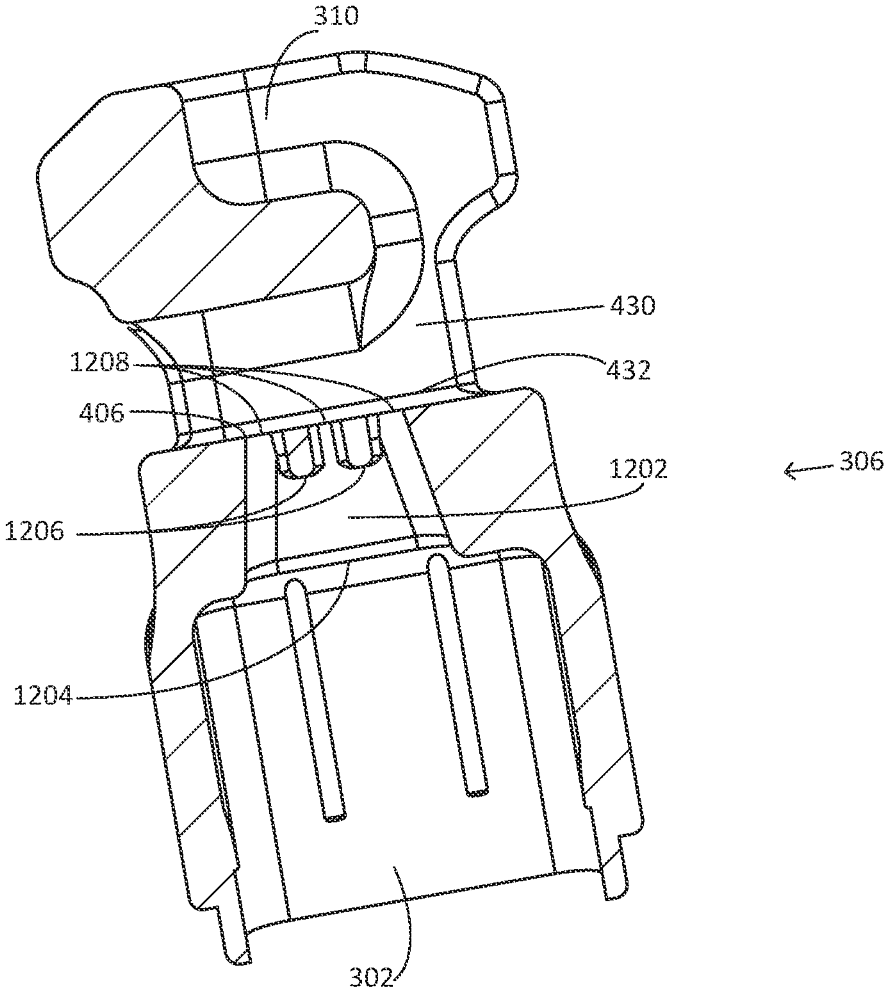
FIG. 12 is a cross-sectional view of the front receiver housing of FIG. 8 along line 12-12 of FIG. 11.

The receiver opening 406 and cavity passage 1202 of FIGS. 8-12 are different compared to the receiver opening 406 and cavity passage 702 of FIGS. 1-7 and will now be described with reference to FIGS. 11 and 12. FIG. 11 is a cross-sectional view of the front receiver housing of FIG. 8 along line 11-11 in FIG. 10, and FIG. 12 is a cross-sectional view of the front receiver housing of FIG. 8 along line 12-12 of FIG. 11.

The cavity passage 1202 extends from the receiver opening 406 to a cavity opening 1204. In various embodiments, the receiver opening 406 has a smaller largest dimension, a smaller cross-sectional area, or both than the cavity opening 1204. The cavity passage 1202 tapers to the smaller dimensions of the receiver opening 406. In other words, the cavity passage is tapered to have an increasing cross-sectional area as the cavity passage extends away from the pass-through passage. This configuration can reduce the likelihood of liquid entering the receiver housing through the receiver opening 406.

The receiver opening 406 is defined by the shelf 432, which can include multiple ribs 1206 in various embodiments. The ribs 1206 in the receiver opening 406 provide a barrier for entry of earwax. In various embodiments, two ribs 1206 define three apertures 1208. In various embodiments, one rib, two ribs, three ribs or another number of ribs are provided that extend across the receiver opening 406 and create two, three, four, or another number of multiple apertures.

The ribs 1206 can have a profile so that the apertures are smaller closer to the pass-through passage 430 than to the cavity 302. This configuration further reduces the likelihood of liquid entering the cavity 302, while still allowing sound to travel efficiently to the receiver channel 310 from the cavity 302.

Filter

Figure 13:
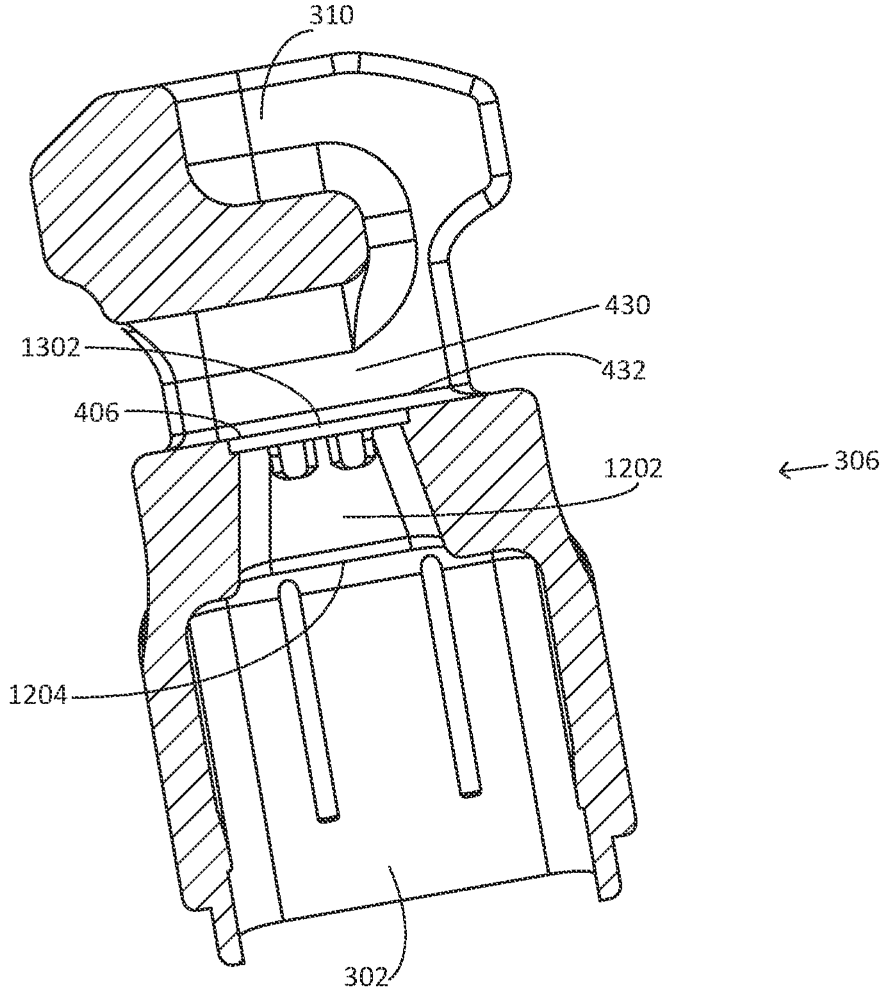
FIG. 13 is a cross-sectional view of an alternate front receiver housing from the same cross-sectional viewpoint as FIG. 12, including a filter in the receiver opening.

The receiver housing 102 can incorporate a filter into the receiver opening 406. FIG. 13 is a cross-sectional view of an alternate front receiver housing 306 from the same cross-sectional viewpoint as FIG. 12, including a filter 1302 across the receiver opening. The filter can be a wire mesh, a membrane, a foam, or a polystyrene foam. The filter can be secured to the receiver housing by over molding, adhesive, or plastic welding.

Wrap-Around Segment

Figure 14:
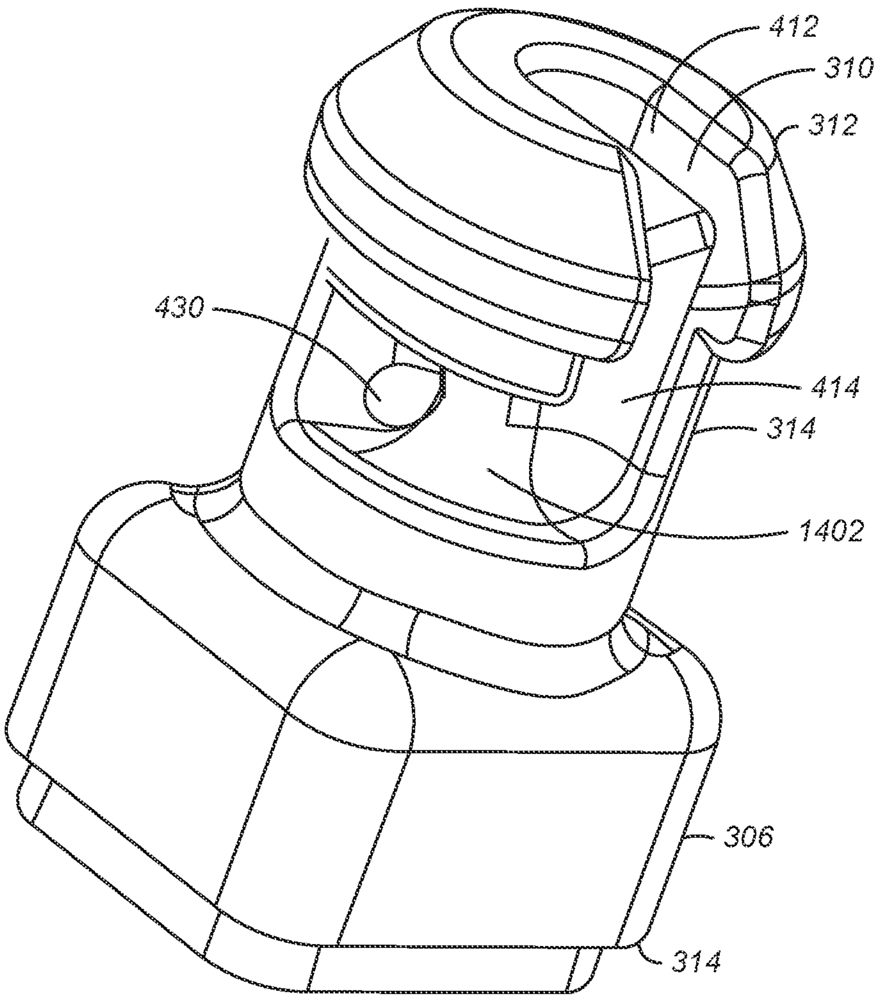
FIG. 14 is a perspective side view of an alternate front receiver housing having a wrap-around segment of a circuitous receiver acoustic channel.

The receiver channel 310 of the receiver housing 102 can take on many different shapes. FIG. 14 is a perspective side view of an alternate front receiver housing 306 with a different receiver channel 310 configuration compared to FIGS. 3-13. The receiver channel 310 of FIG. 14 extends from the front end 312 of the front receiver housing 306 to the receiver opening (not shown in FIG. 14). The receiver channel 310 of FIG. 14 includes a front segment 412, a side segment 414, and a wrap-around segment 1402 wrapping around a circumference of the side surface 316 of the front receiver housing. The front receiver housing 306 of FIG. 14 also includes a pass-through passage 430 extending from the wrap-around segment 1402 to the receiver opening, though only a small portion of the pass-through passage 430 is shown and the receiver opening is not shown in FIG. 14.

Receiver Housing

Now referring to FIGS. 3-5, the receiver housing 102 of the examples described herein include a front receiver housing 306 and a rear receiver housing 308, extending from a front end or face 312 of the front receiver housing 306 to a rear face 324 of the rear receiver housing 308. The receiver housing 102 is positioned in the ear canal so that the front end or front face 312 is inserted into the ear first and is positioned more deeply within the ear canal.

The front receiver housing can be a unitary structure in various embodiments, so that the unitary structure cannot be broken down into smaller pieces without destroying the front receiver housing. In various examples, the front receiver housing is a unitary molded structure. The rear receiver housing 308 can also be a unitary structure. The rear receiver housing can be a unitary molded structure.

Instead of a front receiver housing 306 and a rear receiver housing 308, it is possible for the receiver housing 102 to be divided into two pieces around the cavity 302 in a different configuration, such as two side housings or a receiver housing with a hatch for inserting the receiver assembly 304. Wherever the front receiver housing 306 is described as defining the receiver channel, defining the pass-through passage, or having other features herein, it should be understood that those descriptions apply to the receiver housing 102 as a whole, however the receiver housing 102 might be divided to give access to the cavity 302. As a result, the term "receiver housing" could be used accurately in place of "front receiver housing" in most locations herein.

In various examples, the components of the receiver housing 102 are connected to form the cavity 302 for the receiver assembly 304 by using adhesive or plastic bonding. Now referring to FIGS. 2-3, the receiver housing 102 defines an opening 210 that can be used to attach an accessory device, such as a device that improves retention of the receiver housing in the ear canal. Now referring to FIG. 4, the receiver housing 102, and more specifically the rear receiver housing 308 defines a cable inlet 440 where the cable 106 (FIG. 1) enters the receiver housing 102.

Figure 16:
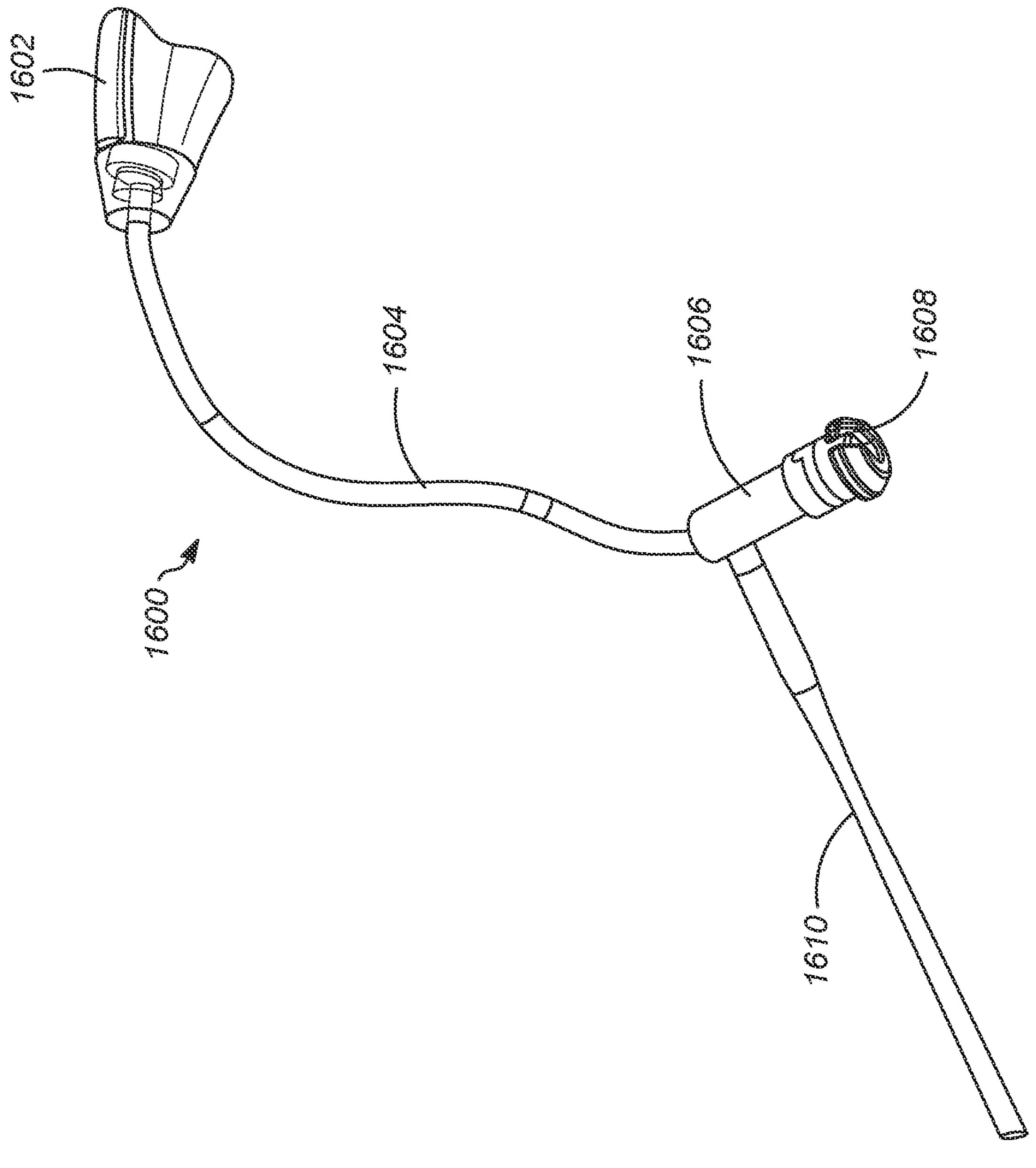
FIG. 16 is an alternate receiver housing according to various examples.

Alternate Receiver Housing of FIG. 16

FIG. 16 illustrates an alternative receiver housing 1600 compared to the other FIGS. In the example of FIG. 16, the receiver housing 1600 includes a behind-the-ear (BTE) receiver housing 1602, a length of audio tubing 1604, and an in-canal housing 1606. The BTE receiver housing 1602 can make up a portion of a larger external unit that is positionable behind the user's ear, similar to external unit 101 of FIG. 1.

The audio tubing 1604 provides acoustic communication between the BTE receiver housing 1602 and the in-canal housing 1606.

The in-canal housing 1606 is the portion of the alternative receiver housing 1600 that defines a circuitous receiver acoustic channel 1608 as described herein. The receiver channel 1608 can have any of the configurations described herein. The in-canal housing 1606 can be covered by an ear bud such as the ear bud shown in FIGS. 1-4. Features of the receiver housings described herein can also be present in the receiver housing of FIG. 16, including defining an opening in acoustic communication with the receiver speaker in a wall of the receiver channel 1608. A flexible protrusion 1610 may also be provided to assist with retaining the in-canal housing 1606 in a desired position.

Retaining Stem Configurations

Figure 8:
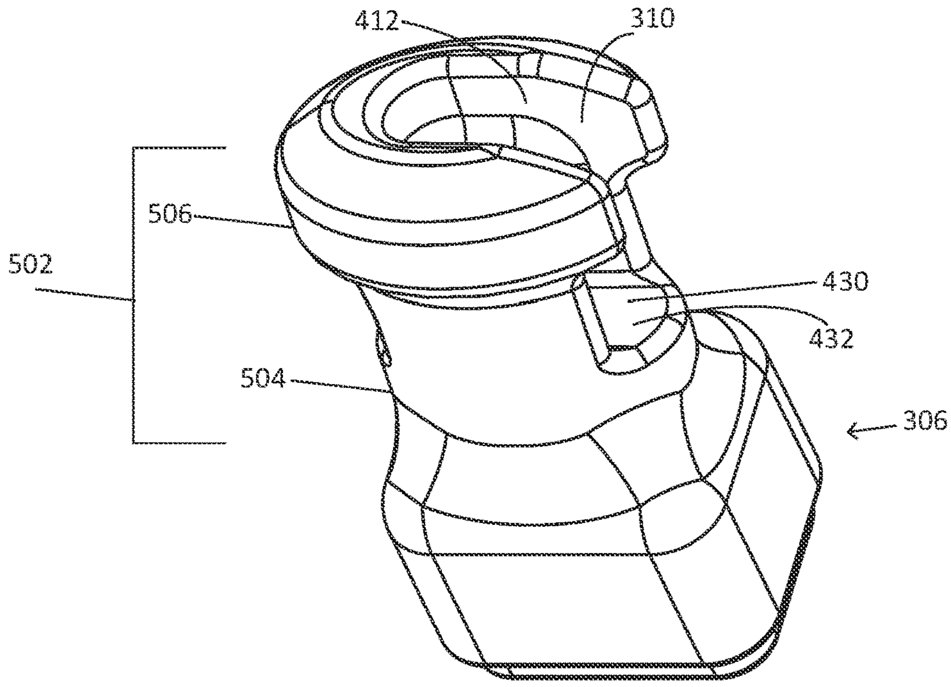
FIGS. 8 and 9 are perspective views from different angles of an alternate front receiver housing in accordance with various embodiments herein.
Figure 9:
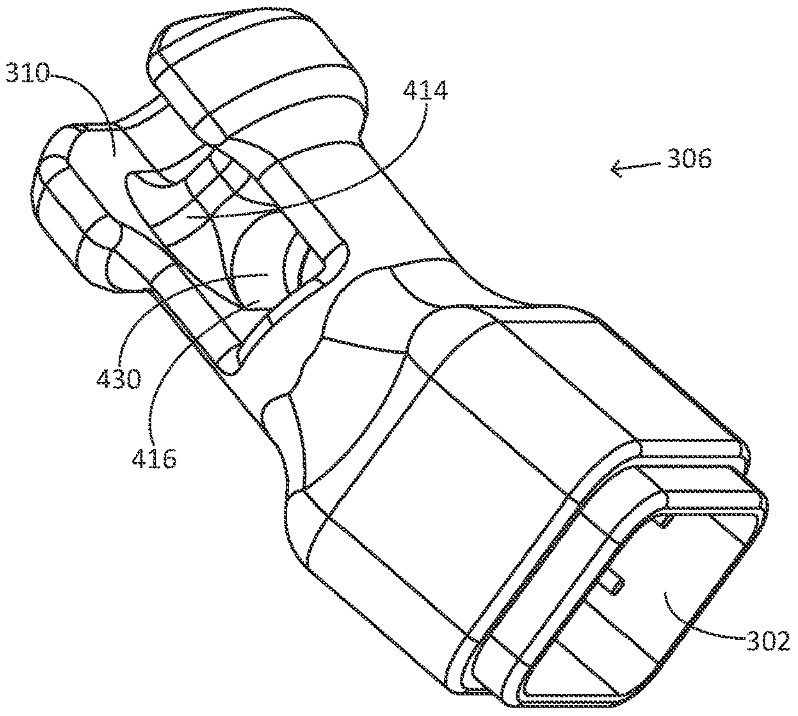

The front receiver housing 306 includes a retaining stem that interfaces with an interior surface of an earbud. The embodiments of FIGS. 1-7 and FIGS. 8-12 have a front receiver housing 306 that includes a retaining stem 502, best illustrated in FIG. 5 and in FIG. 8. The retaining stem 502 extends away from a remainder of the front receiver housing 306 and includes a neck portion 504 and a retaining ridge 506. The retaining ridge 506 is wider from a side perspective than the neck portion 504, and the neck portion is narrower from a side perspective from the remainder of the front receiver housing 306. The retaining stem 502 of FIGS. 1-7 and 8-12 has a generally oval shape when viewed from a top perspective, as best seen in FIG. 8.

A front receiver housing 306 having an alternate embodiment of a retaining stem 1702 is shown from different viewpoints in FIGS. 17-20. Like reference numbers refer to similar parts in FIGS. 17-20 compared to FIGS. 1-12. Like the embodiments of FIGS. 1-12, the retaining stem 1702 is configured to interface with an interior surface of an earbud and extends away from a remainder of the front receiver housing 306. Like the embodiments of FIGS. 1-12, the front receiver housing 306 of FIGS. 17-20 includes a circuitous acoustic receiver channel 310, pass-through passage 430, and defines half of a cavity 302 for the receiver.

Figure 18:
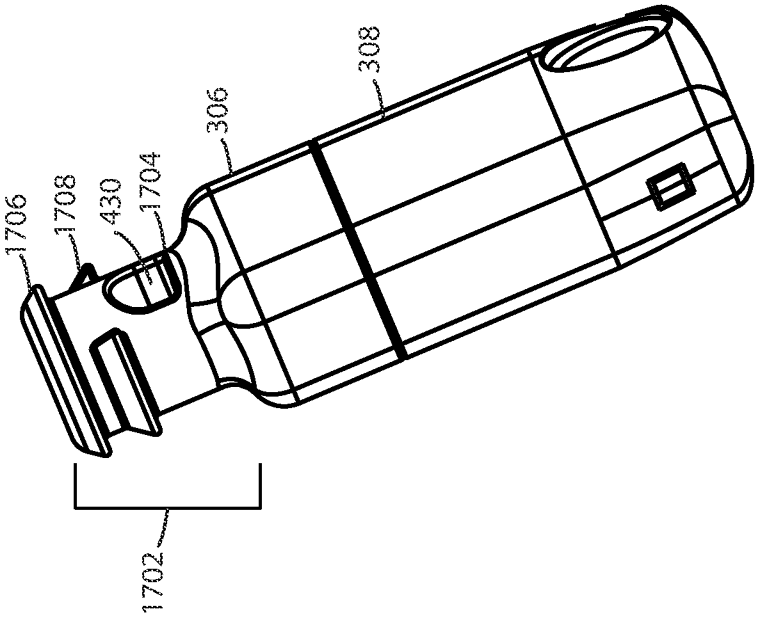
FIG. 18 is another side perspective view of the receiver housing of FIG. 17 in accordance with various embodiments herein.
Figure 17:
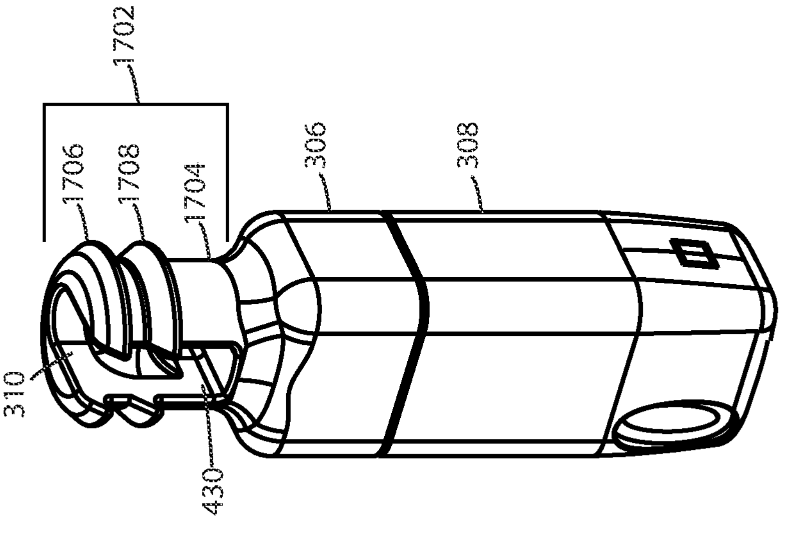
FIG. 17 is a side perspective view of a receiver housing having an alternate retaining stem in accordance with various embodiments herein.
Figure 20:
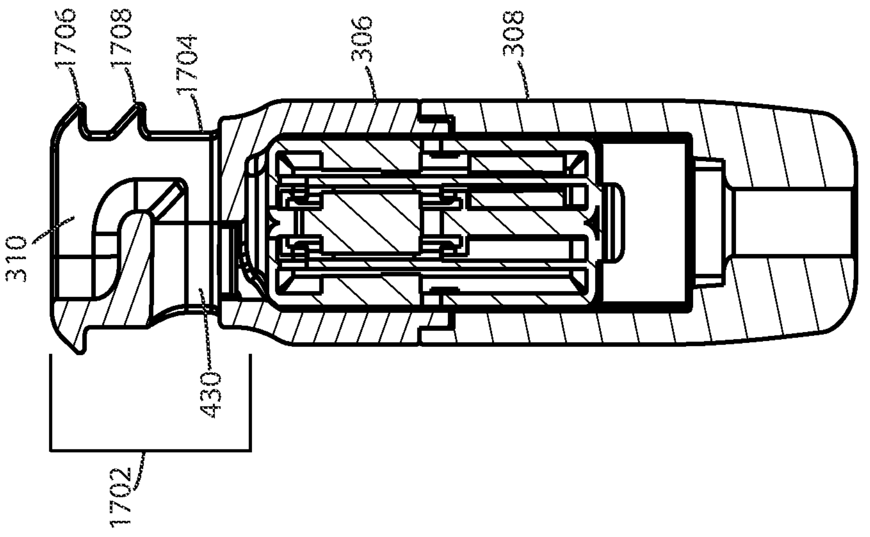
FIG. 20 is a cross-sectional view of the receiver housing of FIG. 17 in accordance with various embodiments herein.
Figure 19:
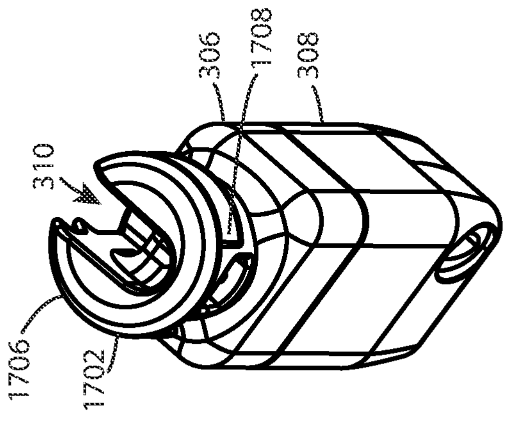
FIG. 19 is a top end perspective view of the receiver housing of FIG. 17 in accordance with various embodiments herein.

The retaining stem 1702 of the embodiment of FIGS. 17-20 has a different configuration than the retaining stem 502 of FIGS. 1-12. The retaining stem 1702 includes a neck portion 1704 that is narrower from a side perspective than the remainder of the front receiver housing 306. In some embodiments, the retaining stem 1702 includes a first radial ridge 1706 near a top end of the retaining stem 1702. In addition, or in the alternative, the retaining stem 1702 includes a second radial ridge 1708 spaced away from the top end of the retaining stem 1702. The retaining stem 1702 of FIGS. 17-20 has a generally circular shape when viewed from a top perspective, as best seen in FIG. 19. The first radial ridge 1706 and the second radial ridge 1708 are both interrupted by the receiver channel 310. In some embodiments, as shown in FIG. 18 and FIG. 20, the second radial ridge is interrupted over an opening to the pass-through passage 430.

Cleaning Tool

A cleaning tool can be used with a hearing aid system as described herein to remove accumulated earwax from a receiver channel, thereby maintaining the audio performance of the system and reducing the likelihood of damage to the components in the receiver channel. The cleaning tool can have an extension that is sized to enter and exit the pass-through passage, can have a portion for scraping wax from the circuitous receiver acoustic channel defined by the receiver housing, and can have a portion with bristles or a cleaning surface that contacts the walls of the pass-through passage. The cleaning tool can be used when the earbud is not covering the receiver channel. The receiver channel is sized so that the user has a line of sight into the receiver channel to monitor the results of cleaning efforts during the cleaning process.

Figure 15:
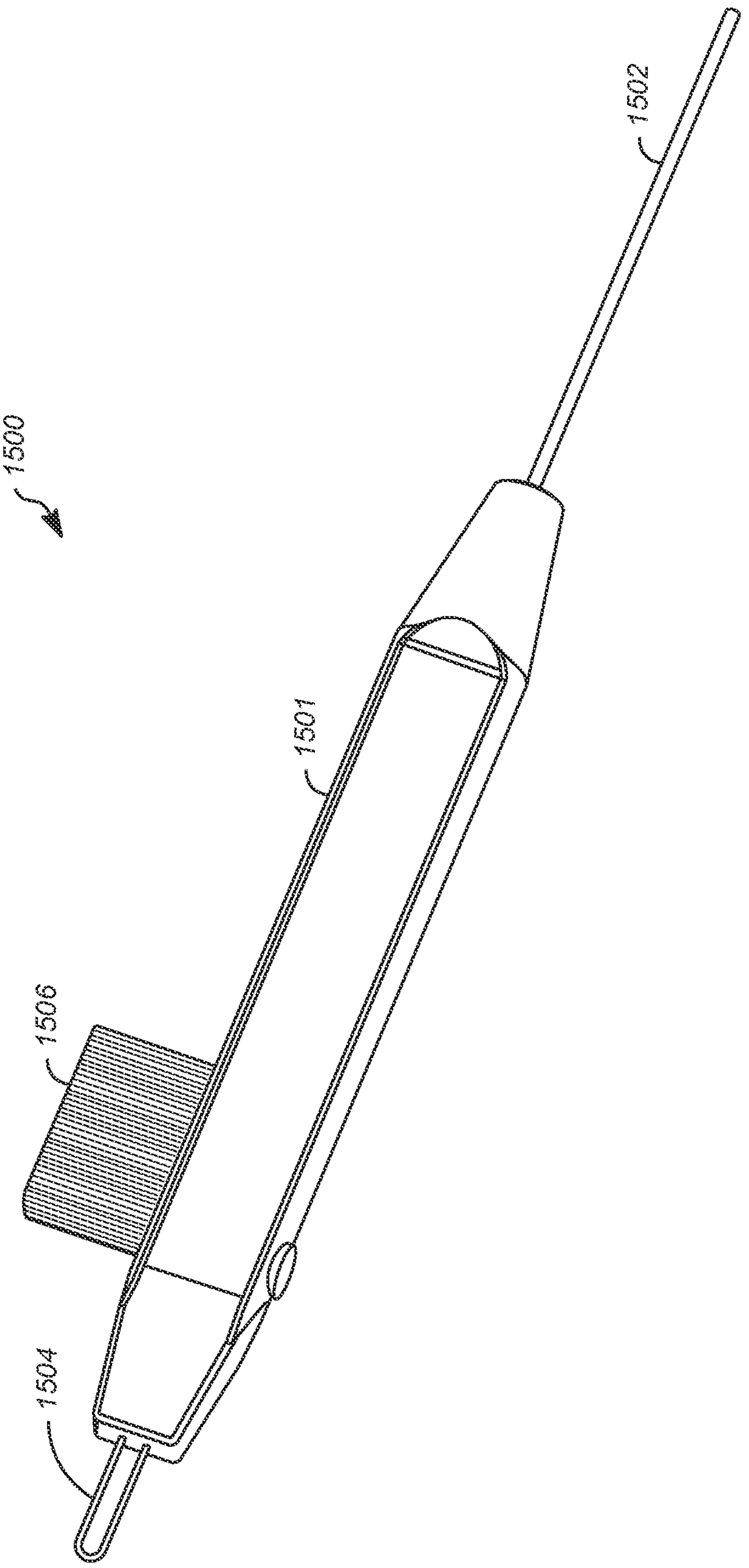
FIG. 15 is a perspective view of a cleaning tool for use with a hearing aid system described herein.

FIG. 15 is a perspective view of one example of a cleaning tool for use with a hearing aid system described herein. The cleaning tool 1500 can include a handle portion 1501 where the user grasps the cleaning tool. The cleaning tool can include a push-through extension 1502 which is designed to enter and exit the pass-through passage and clear wax from the pass-through passage. In one example, the push-through extension 1502 is a flexible monofilament line extending from one end of the cleaning tool 1500. In one example, the push-through extension has a length of about 1 inch (2.54 cm). The cleaning tool 1500 can have a scraping tool extension 1504 for scraping wax from the receiver channel. In one example, the scraping tool extension 1504 is a wire loop. The cleaning tool 1500 can also have a brush 1506 sized to brush wax from the receiver channel. It is also possible for the cleaning tool 1500 to include a magnet used to control the hearing aid assembly.

Methods of Making

A method of making a hearing aid assembly includes providing a receiver assembly including a receiver speaker and providing components of a receiver housing that can be assembled to enclose the receiver assembly. The receiver housing defines a circuitous receiver acoustic channel, also referred to as a receiver channel, which has an open side along at least a portion of the receiver channel. The receiver housing also defines a receiver opening in a wall of the receiver channel, where the receiver opening is in acoustic communication with the receiver speaker when the receiver housing is assembled to enclose the receiver speaker. The receiver housing also defines a pass-through passage extending from a first side of the receiver housing to a second side of the receiver housing, wherein the pass-through passage is partially defined by the wall defining the receiver opening.

The method includes the step of assembling the receiver housing around the receiver assembly. The receiver assembly is then enclosed in a cavity of the receiver housing. An earbud is provided that can fit over at least a portion of the receiver housing. The earbud includes an earbud inner surface that at least partially covers the open side of the receiver channel when the earbud is positioned over at least a portion of the receiver housing.

Methods of Using

In a method of using the hearing aid assembly, a user obtains a hearing aid assembly including an external unit, a receiver housing connected to the external unit by a cable, and an earbud. The user places the earbud over a portion of the receiver housing that defines the receiver channel. The portion of the receiver housing covered by the earbud includes a front end of the receiver housing. The user secures the external unit in a location outside of the ear canal, such as behind the ear, over the ear, or clipped to clothing. The user inserts the receiver housing and earbud into one of the user's ear canals. The external unit is powered on. The external unit uses a microphone as an input of sound near the user. The external unit provides an electrical signal using the cable to the receiver assembly, causing the receiver assembly to generate amplified, optimized, or processed sound to the user's ear canal. The sound travels from the receiver assembly, out the receiver opening, along the receiver channel which includes a portion of the pass-through passage, through the earbud acoustic path, and out of the front earbud opening into the user's ear canal.

Periodically, the user cleans the receiver housing by removing the earbud from the receiver housing and removing earwax or other debris from the earbud acoustic path and from the receiver channel. The user may use a cleaning tool to brush or push debris from the receiver channel. The open side of the receiver channel allows the user to see the results of the cleaning efforts and see when the accumulated earwax has been removed. The user may push the cleaning tool through the pass-through passage to remove earwax.

It should be noted that, as used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

It should also be noted that, as used in this specification and the appended claims, the phrase "configured" describes a system, apparatus, or other structure that is constructed or configured to perform a particular task or adopt a particular configuration. The phrase "configured" can be used interchangeably with other similar phrases such as arranged and configured, constructed and arranged, constructed, manufactured and arranged, and the like.

All publications and patent applications in this specification are indicative of the level of ordinary skill in the art to which this invention pertains. All publications and patent applications are herein incorporated by reference to the same extent as if each individual publication or patent application was specifically and individually indicated by reference.

The embodiments described herein are not intended to be exhaustive or to limit the invention to the precise forms disclosed in the following detailed description. Rather, the embodiments are chosen and described so that others skilled in the art can appreciate and understand the principles and practices. As such, aspects have been described with reference to various specific and preferred embodiments and techniques. However, it should be understood that many variations and modifications may be made while remaining within the spirit and scope herein.

The invention claimed is:

1. A hearing aid assembly comprising:

a receiver housing defining a receiver cavity to enclose a receiver speaker, the receiver housing defining:

a receiver acoustic channel;

a receiver opening defined in a wall of the receiver channel and in acoustic communication with the receiver cavity; and a pass-through passage extending from a first side of the receiver housing to a second side of the receiver housing, wherein the pass-through passage is partially defined by the wall defining the receiver opening.

2. The assembly of claim 1 wherein the receiver channel is circuitous.

3. The assembly of claim 1 wherein the receiver channel comprises at least three segments, wherein each the three segments define an angle with an adjacent segment of 90 degrees or less.

4. The assembly of claim 1 wherein the receiver channel defines a receiver acoustic path having at least four turns of 90 degrees or less.

5. The assembly of claim 1 wherein the receiver channel comprises:

a front segment defined in a front face of the receiver housing, a side segment defined in a side surface of the receiver housing, and a rear segment extending from the side surface of the receiver housing to the receiver opening, wherein the pass-through passage comprises the rear segment of the receiver channel.

6. The assembly of claim 1 wherein the receiver channel defines an open side along at least a portion of the receiver channel.

7. The assembly of claim 6 further comprising an earbud configured to fit over at least a portion of the receiver housing, the earbud comprising an earbud inner surface that at least partially covers the open side of the receiver channel when the earbud is positioned over at least a portion of the receiver housing.

8. The assembly of claim 1 wherein the receiver channel comprises a wrap-around segment that wraps around a circumference of a side surface of the receiver housing.

9. The assembly of claim 1 wherein the receiver housing comprising a front receiver housing and a back receiver housing connectable to form the receiver cavity, wherein the front receiver housing defines the receiver channel, the receiver opening, and the pass-through passage.

10. The assembly of claim 9 wherein the front receiver housing is a unitary structure.

11. The assembly of claim 1 wherein the pass-through passage is perpendicular to an axis of the receiver opening.

12. The assembly of claim 1 wherein the receiver opening comprises two separate apertures.

13. The assembly of claim 1 wherein the receiver opening comprises three separate apertures, wherein the wall defining the receiver opening comprises two ribs, each of the ribs separating two of the three separate apertures.

14. The assembly of claim 1 wherein the receiver housing further defines a cavity passage extending from a receiver opening to a cavity opening, wherein the cavity passage is tapered to have an increasing cross-sectional area as the cavity passage extends away from the receiver opening toward the cavity passage.

15. The assembly of claim 1 wherein receiver housing further comprises a filter positioned across the receiver opening, wherein the filter is a wire mesh, a membrane, a foam, or a polystyrene foam.

16. The assembly of claim 15 wherein the filter is secured to the receiver housing by over molding, adhesive, or plastic welding.

17. The assembly of claim 7 wherein the earbud inner surface seals against the receiver housing over at least a portion of the open side of the receiver channel when the earbud is positioned over at least a portion of the receiver housing.

18. The assembly of claim 7 wherein the earbud comprises a flexible material, a resilient material, or an elastomeric material.

19. A hearing aid assembly comprising:

a receiver assembly comprising a receiver speaker;

a receiver housing defining a receiver cavity to enclose the receiver assembly, the receiver housing defining:

a receiver acoustic channel;

receiver opening defined in a wall of the receiver channel in acoustic communication with the receiver cavity, wherein a cavity passage is tapered to have an increasing cross-sectional area as the cavity passage extends away from the receiver opening to the receiver cavity; and a pass-through passage extending from a first side of the receiver housing to a second side of the receiver housing, wherein the pass-through passage is transverse to a longitudinal axis of the receiver opening; and wherein the receiver housing further defines a cavity passage extending from a receiver opening to a cavity opening, wherein the cavity passage is tapered to have an increasing cross-sectional area as the cavity passage extends away from the receiver opening toward the cavity opening.

20. A method of making a hearing aid assembly comprising:

providing a receiver housing defining a receiver cavity to enclose a receiver speaker defining:

a receiver acoustic channel;

a receiver opening defined in a wall of the receiver channel and configured to be in acoustic communication with the receiver speaker; and a pass-through passage extending from a first side of the receiver housing to a second side of the receiver housing, wherein the pass-through passage is partially defined by the wall defining the receiver opening; and assembling the receiver housing around the receiver speaker.

* * * * *